(12) United States Patent
Wang et al.

(10) Patent No.: US 11,497,591 B2
(45) Date of Patent: Nov. 15, 2022

(54) VIBRATION STRUCTURE OF ELECTRICAL TOOTHBRUSH

(71) Applicant: JIASHAN D-MAX ELECTRONICS CO., LTD., Jiaxing (CN)

(72) Inventors: Wei-Chuan Wang, Jiaxing (CN); Qiang Wei, Jiaxing (CN)

(73) Assignee: JIASHAN D-MAX ELECTRONICS CO., LTD., Jiaxing (CN)

( * ) Notice: Subject to any disclaimer, the term of this patent is extended or adjusted under 35 U.S.C. 154(b) by 348 days.

(21) Appl. No.: 16/824,709

(22) Filed: Mar. 20, 2020

(65) Prior Publication Data

US 2021/0177561 A1  Jun. 17, 2021

(30) Foreign Application Priority Data

Dec. 13, 2019  (TW) .................................. 108145782

(51) Int. Cl.
*A61C 17/34* (2006.01)
(52) U.S. Cl.
CPC .................................. *A61C 17/3481* (2013.01)
(58) Field of Classification Search
CPC .................................................. A61C 17/3481
See application file for complete search history.

(56) References Cited

FOREIGN PATENT DOCUMENTS

| CA | 2042499 A1 | 11/1991 |
|---|---|---|
| CN | 1631555 A | 6/2005 |
| CN | 209678737 U | 11/2019 |
| JP | 5194904 B2 | 5/2013 |
| TW | I659730 B | 5/2019 |
| TW | 594442 U | 5/2020 |

OTHER PUBLICATIONS

Search Report dated May 13, 2020 issued by Taiwan Intellectual Property Office for counterpart application No. 108145782.

*Primary Examiner* — Shay Karls
(74) *Attorney, Agent, or Firm* — Demian K. Jackson; Jackson IPG PLLC (57) ABSTRACT

A vibration structure of electrical toothbrush includes an eccentric rod. Two ends of the eccentric rod are respectively formed with a transmission section and a weight section. The transmission section is drivable by a driving force to rotate so as to drive the weight section to eccentrically vibrate. The weight section has an opening and a receiving space inward recessed from the opening. A cover member is correspondingly mated with the opening to cover the same. A weight block is disposed in the receiving space to partially or totally increase the weight of the weight section, whereby due to the increased weight, the weight section is unbalanced in weight to deflect from a central axis of the eccentric rod.

8 Claims, 12 Drawing Sheets

VIBRATION STRUCTURE OF ELECTRICAL TOOTHBRUSH

This application claims the priority benefit of Taiwan patent application number 108145782 filed on Dec. 13, 2019.

BACKGROUND OF THE INVENTION

1. Field of the Invention

The present invention relates generally to a vibration structure, and more particularly to a vibration structure of electrical toothbrush.

2. Description of the Related Art

The electrical toothbrush has the advantage that the electrical toothbrush is non-manually operated to vibrate and produce bubbles from the toothpaste. The conventional electrical toothbrush has an eccentric rod inside. A weight unit is disposed on the eccentric rod. Due to unbalanced weight of the weight unit, when the eccentric rod is rotated, the eccentric rod will at the same vibrate. In general, the weight unit has a U-shaped notch.

However, when the eccentric rod rotates, the U-shaped notch of the weight unit will cause wind resistance and make noise.

It is therefore tried by the applicant to provide a vibration structure of electrical toothbrush to solve the above problem existing in the conventional electrical toothbrush.

SUMMARY OF THE INVENTION

It is therefore a primary object of the present invention to provide a vibration structure of electrical toothbrush, which can reduce wind resistance and lower noise made when the eccentric rod of the electrical toothbrush is rotated.

To achieve the above and other objects, the vibration structure of electrical toothbrush of the present invention includes an eccentric rod. The eccentric rod has a transmission section and a weight section. The transmission section is drivable by a driving force to rotate so as to drive the weight section to eccentrically vibrate. The weight section has an opening and a receiving space inward recessed from the opening. A weight block is disposed in the receiving space to partially or totally increase the weight of the weight section, whereby the weight section is unbalanced in weight to deflect from a central axis of the eccentric rod. A cover member is correspondingly mated with the opening to cover the same.

According to the design of the present invention, the notch on the outer surface of the weight section is reduced so that when the weight section is rotated, the wind resistance is reduced and the noise is lowered.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
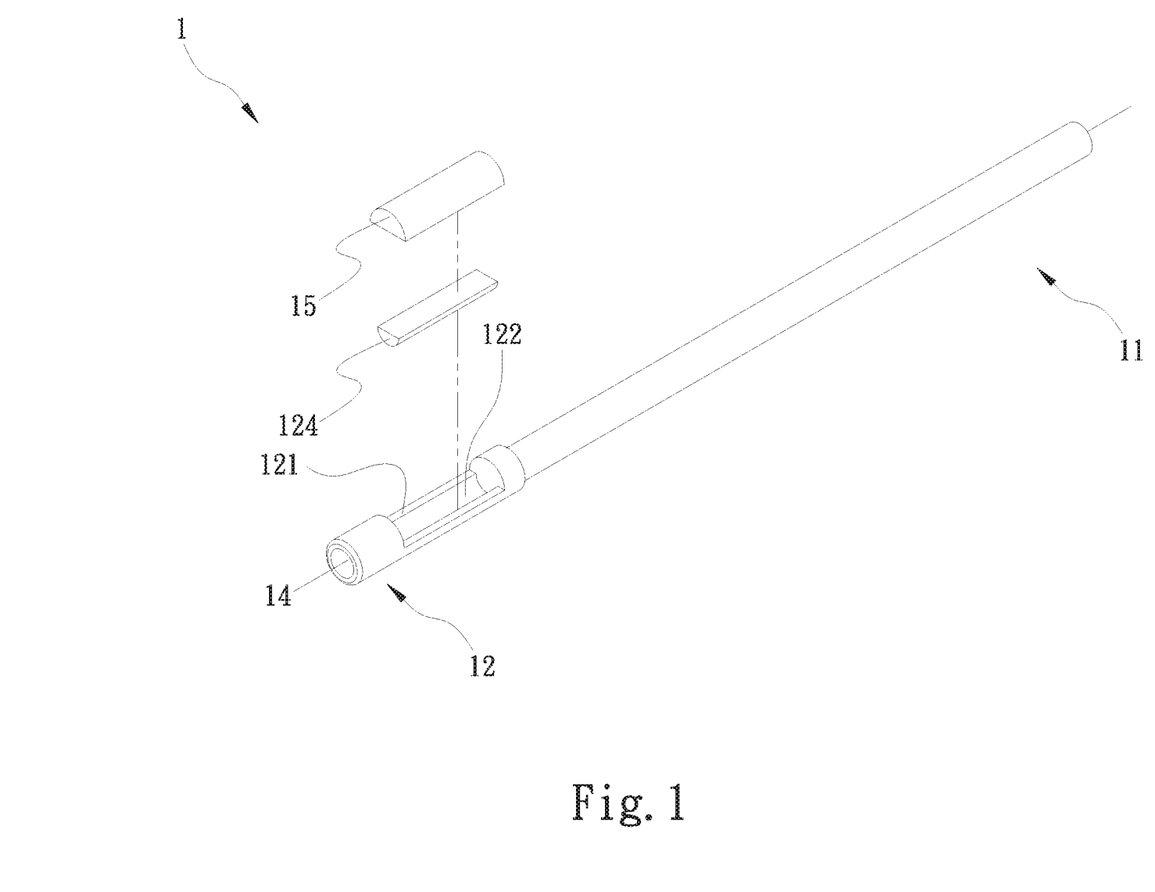
FIG. 1 is a perspective exploded view of a first embodiment of the vibration structure of electrical toothbrush of the present invention.
Figure 2:
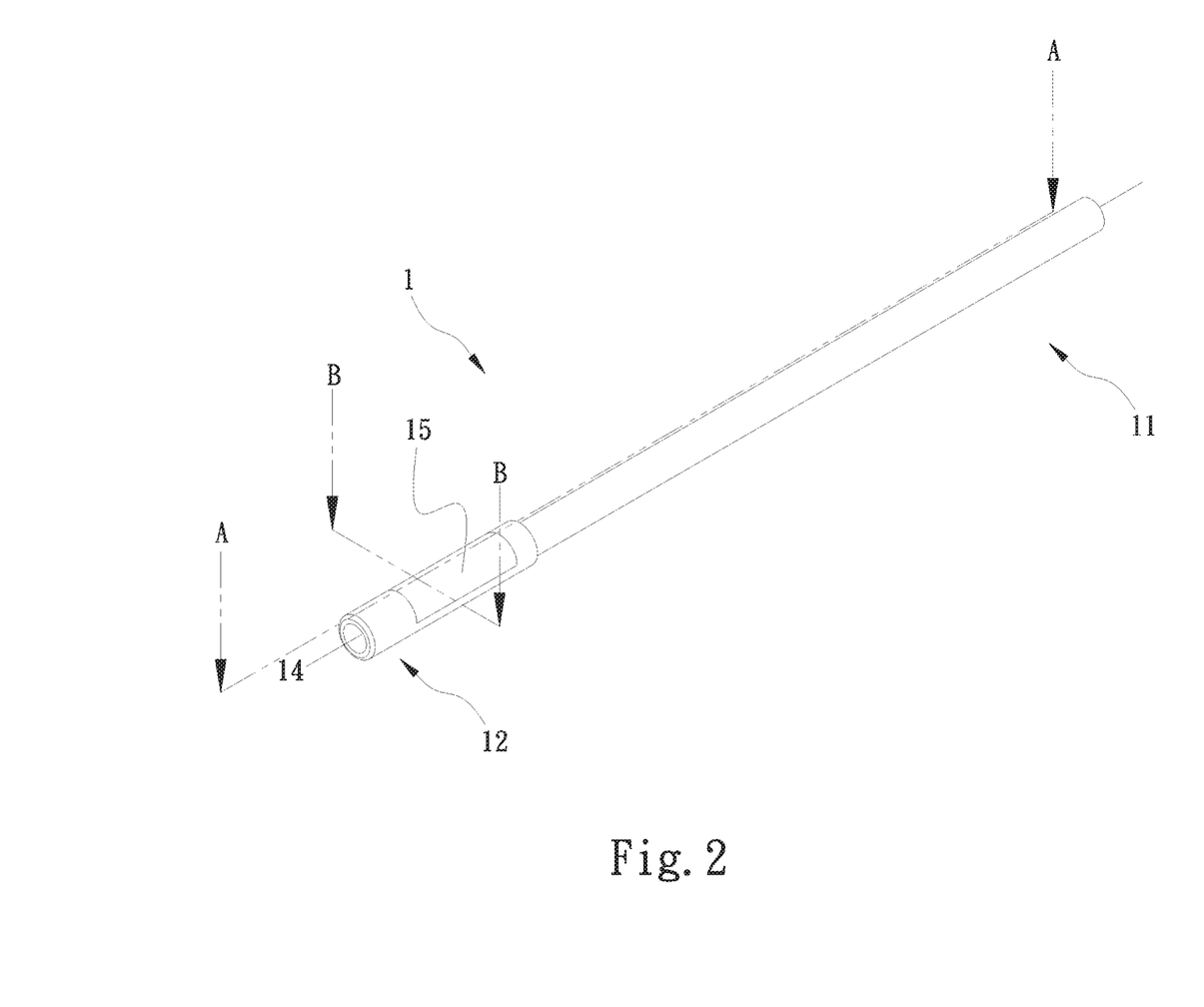
FIG. 2 is a perspective assembled view of the first embodiment of the vibration structure of electrical toothbrush of the present invention.
Figure 3:
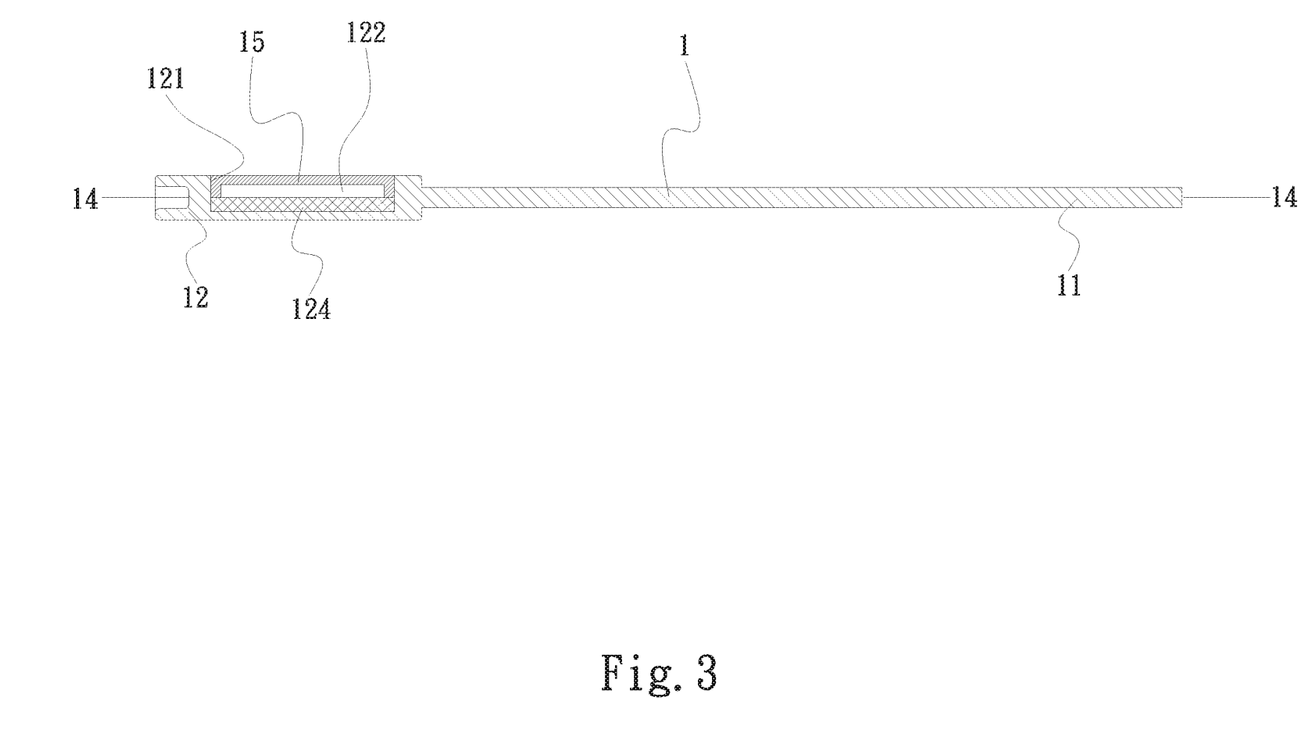
FIG. 3 is a sectional view of the vibration structure of electrical toothbrush of the present invention, taken along line A-A of FIG. 2.
Figure 4:
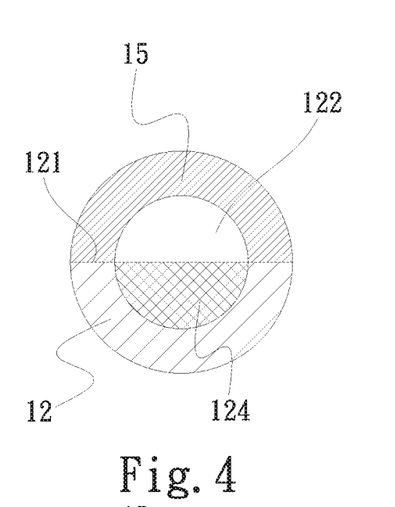
FIG. 4 is a sectional view of the vibration structure of electrical toothbrush of the present invention, taken along line B-B of FIG. 2.

Please refer to FIGS. 1 to 4. FIG. 1 is a perspective exploded view of a first embodiment of the vibration structure of electrical toothbrush of the present invention. FIG. 2 is a perspective assembled view of the first embodiment of the vibration structure of electrical toothbrush of the present invention. FIG. 3 is a sectional view of the vibration structure of electrical toothbrush of the present invention, taken along line A-A of FIG. 2. FIG. 4 is a sectional view of the vibration structure of electrical toothbrush of the present invention, taken along line B-B of FIG. 2. According to the first embodiment, the vibration structure of electrical toothbrush of the present invention includes an eccentric rod 1. The eccentric rod 1 is an axially extending shaft rod (core) in the form of a bar (stein, stick or rod). Two ends of the eccentric rod 1 are respectively formed with a transmission section 11 and a weight section 12. The transmission section 11 and the weight section 12 can be integrally formed. Alternatively, the transmission section 11 and the weight section 12 are two separate components, which are securely connected with each other by means of insert injection molding, adhesion, engagement, press fit, welding or screwing.

The transmission section 11 is drivable by a driving force. The driving force is output from a drive source. The substantially structure of the drive source will be specifically described in other embodiments.

The weight section 12 has an opening 121 and a receiving space 122 inward recessed from the opening 121. A weight block 124 is disposed in the receiving space 122 to partially increase the weight of the weight section 12, whereby the weight section 12 is unbalanced in weight to deflect from a central axis 14 of the eccentric rod 1. The unbalance in weight is such that the weight block 124 partially or totally increases the weight of the weight section 12, whereby the gravity center of the weight section 12 is deflected from the central axis 14 of the eccentric rod 1. Accordingly, when the weight section 12 is driven by the transmission section 11 to rotate, the weight section 12 will eccentrically vibrate.

The weight block 124 is disposed in the receiving space 122 to selectively axially extend, at equal intervals or at unequal intervals. In case that the weight block 124 axially extends, the weight block 124 will totally increase the weight in the receiving space 122. In case that the weight block 124 is disposed at equal intervals or unequal intervals, the weight block 124 will partially increase the weight in the receiving space 122 to lead to unbalance in weight of the weight section 12.

Figure 5:
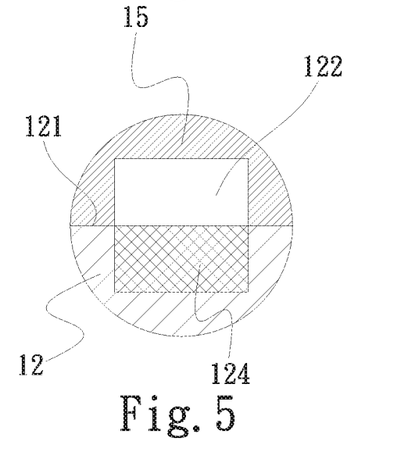
FIG. 5 is a sectional view of a modified embodiment according to the first embodiment of the vibration structure of electrical toothbrush of the present invention.
Figure 6:
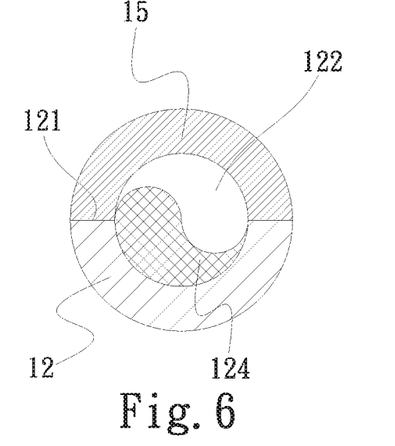
FIG. 6 is a sectional view of a modified embodiment according to the first embodiment of the vibration structure of electrical toothbrush of the present invention.

A cover member 15 is correspondingly mated with the opening 121 to cover the same. The receiving space 122 has a circular cross section (as shown in FIG. 4), a polygonal cross section (as shown in FIG. 5) or any geometrical cross section (as shown in FIG. 6) corresponding to the cover member 15.

In this embodiment, the weight block 124 has a semicircular cross section corresponding to the receiving space 122 (as shown in FIG. 4). The diameter of the weight block 124 is, but not limited to, equal to the diameter of the receiving space 122. In a modified embodiment, the weight block 124 alternatively has a polygonal cross section (as shown in FIG. 5) or any geometrical cross section (as shown in FIG. 6). In addition, the weight block 124 is made of metal or nonmetal material.

In this embodiment, the weight block 124 and the receiving space 122 are, but not limited to, two separate components, which are secured to each other by means of insert injection molding, adhesion, engagement, press fit, welding or screwing. In a modified embodiment, the weight block 124 and the receiving space 122 are integrally formed.

Moreover, the eccentric rod 1 and the cover member can be made of thermoplastic material such as, but not limited to, polyoxymethylene (POM), which has wear resistance.

According to the design of the present invention, the weigh block 124 is eccentrically positioned relative to the central axis 14 of the eccentric rod 1, whereby the weight of the weight section 12 is partially or totally increased to lead to unbalance in weight. Therefore, the gravity center of the weight section 12 is deflected from the central axis 14 of the eccentric rod 1. Accordingly, when the eccentric rod 1 is driven by the driving force, the position of the weight section 12 in circumferential direction is continuously varied to produce eccentric vibration effect. In addition, the cover member 15 is correspondingly mated with the weight section 12 of the eccentric rod 1 so that the notch on the outer surface of the weight section 12 is reduced. In this case, when the weight section 12 is eccentrically rotated, the wind resistance can be reduced and the noise is lowered.

Figure 7:
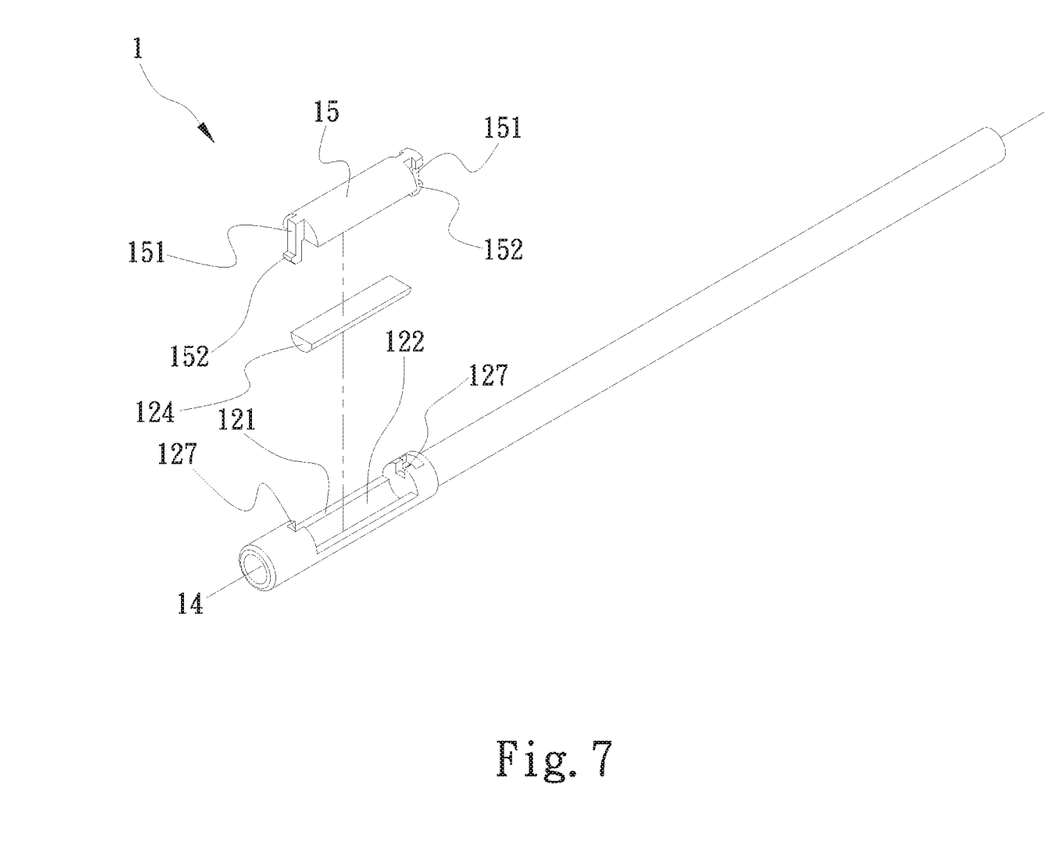
FIG. 7 is a perspective exploded view of a second embodiment of the vibration structure of electrical toothbrush of the present invention.
Figure 8:
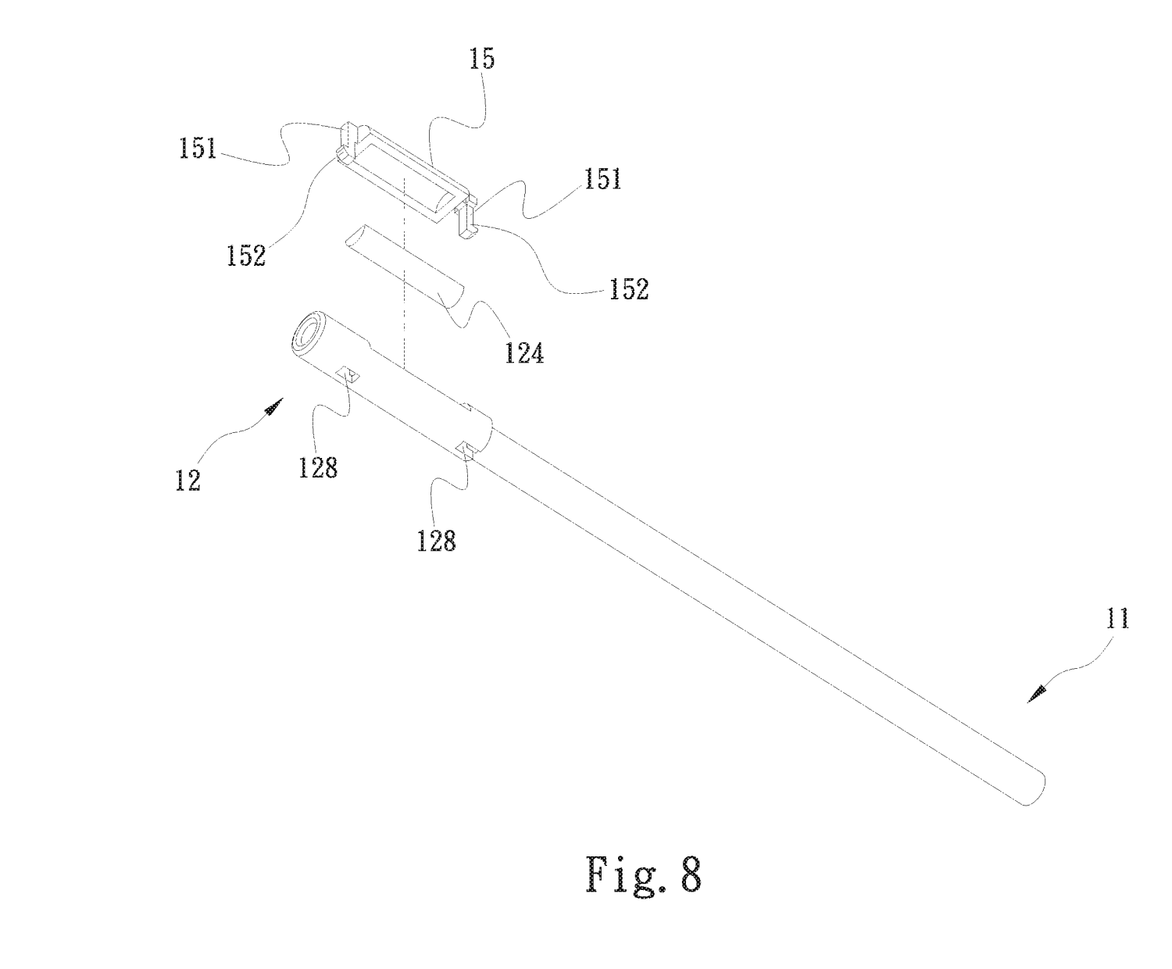
FIG. 8 is a perspective exploded view of the second embodiment of the vibration structure of electrical toothbrush of the present invention, seen from another angle.
Figure 9:
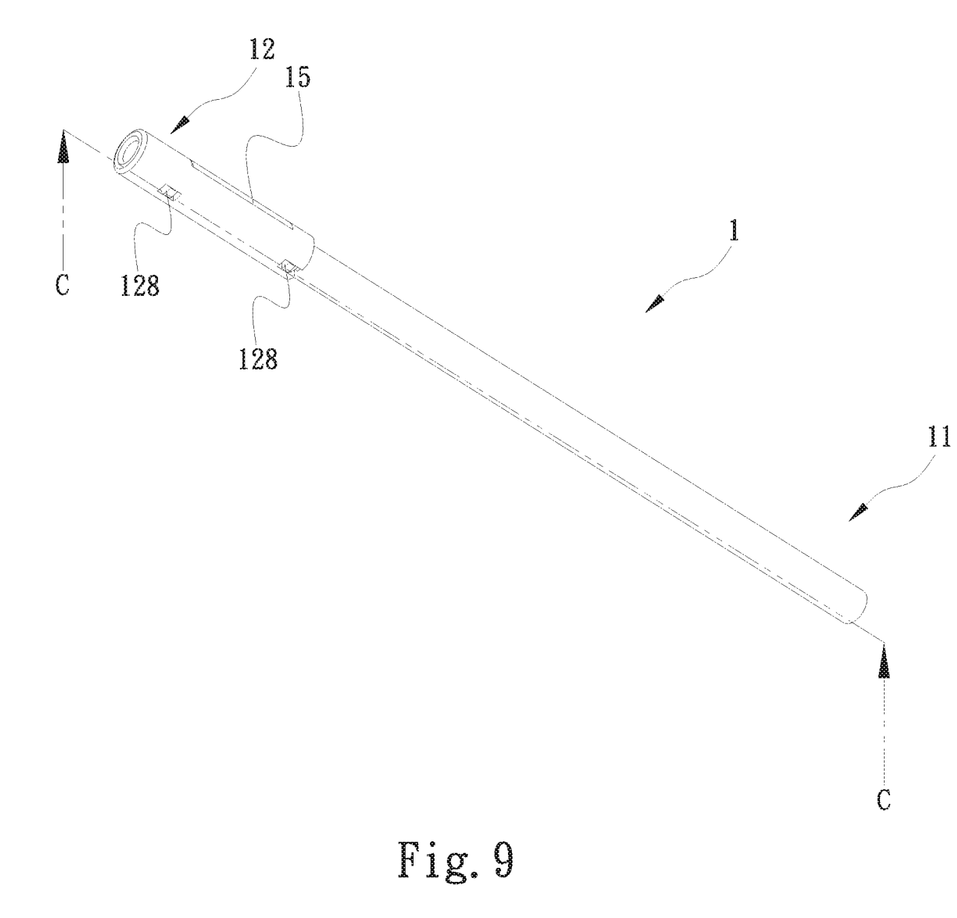
FIG. 9 is a perspective assembled view of the second embodiment of the vibration structure of electrical toothbrush of the present invention.
Figure 10:
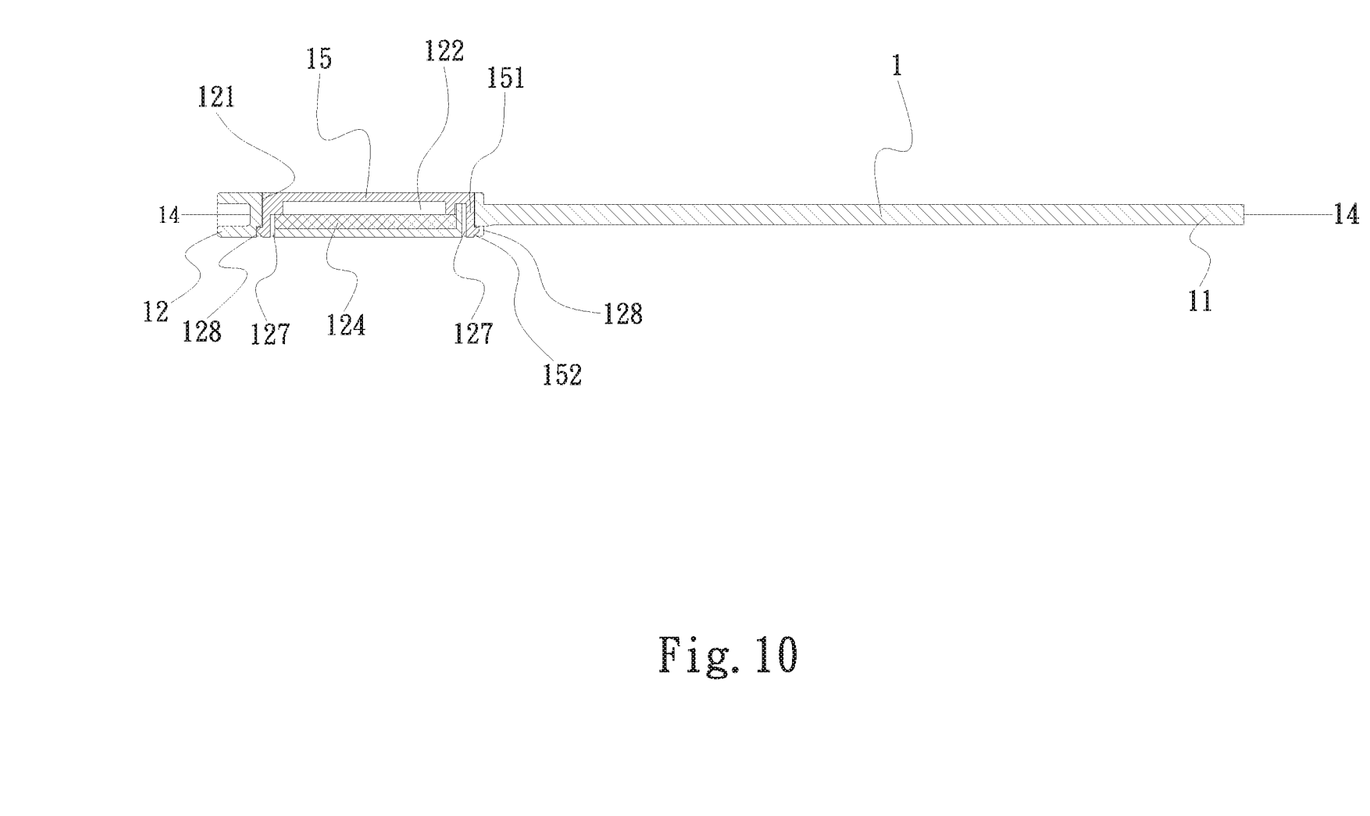
FIG. 10 is a sectional view of the vibration structure of electrical toothbrush of the present invention, taken along line C-C of FIG. 9.

Please refer to FIGS. 7 to 10. FIG. 7 is a perspective exploded view of a second embodiment of the vibration structure of electrical toothbrush of the present invention. FIG. 8 is a perspective exploded view of the second embodiment of the vibration structure of electrical toothbrush of the present invention, seen from another angle. FIG. 9 is a perspective assembled view of the second embodiment of the vibration structure of electrical toothbrush of the present invention. FIG. 10 is a sectional view of the vibration structure of electrical toothbrush of the present invention, taken along line C-C of FIG. 9. Also referring to FIGS. 1 to 6, the second embodiment is partially identical to the first embodiment in structure and function and thus will not be redundantly described hereinafter. The second embodiment is different from the first embodiment in that the weight section 12 is formed with two perforations 127 corresponding to the opening 121. The two perforations 127 radially pass through the outer surface of the weight section 12. The outer surface of the weight section 12 is recessed to form two hooked holes 128 corresponding to the perforations 127. The cover member 15 is formed with two hook legs 151 corresponding to the opening 121. The free end of each hook leg 151 has a hooking section 152. The hook leg 151 and the hooking section 152 are substantially L-shaped. When the cover member 15 is used to securely press the weight block 124 in the receiving space 122, the hook legs 151 are respectively passed through the perforations 127 and the hooking sections 152 are respectively hooked in the hooked holes 128 so that the cover member 15 can press the weight block 124 to secure the same. When it is necessary to open the cover member 15, the hooking sections 152 are forced in reverse direction, whereby the hook legs 151 can be extracted out of the perforations 127 so that the cover member 15 can be removed from the weight section 12.

Figure 11:
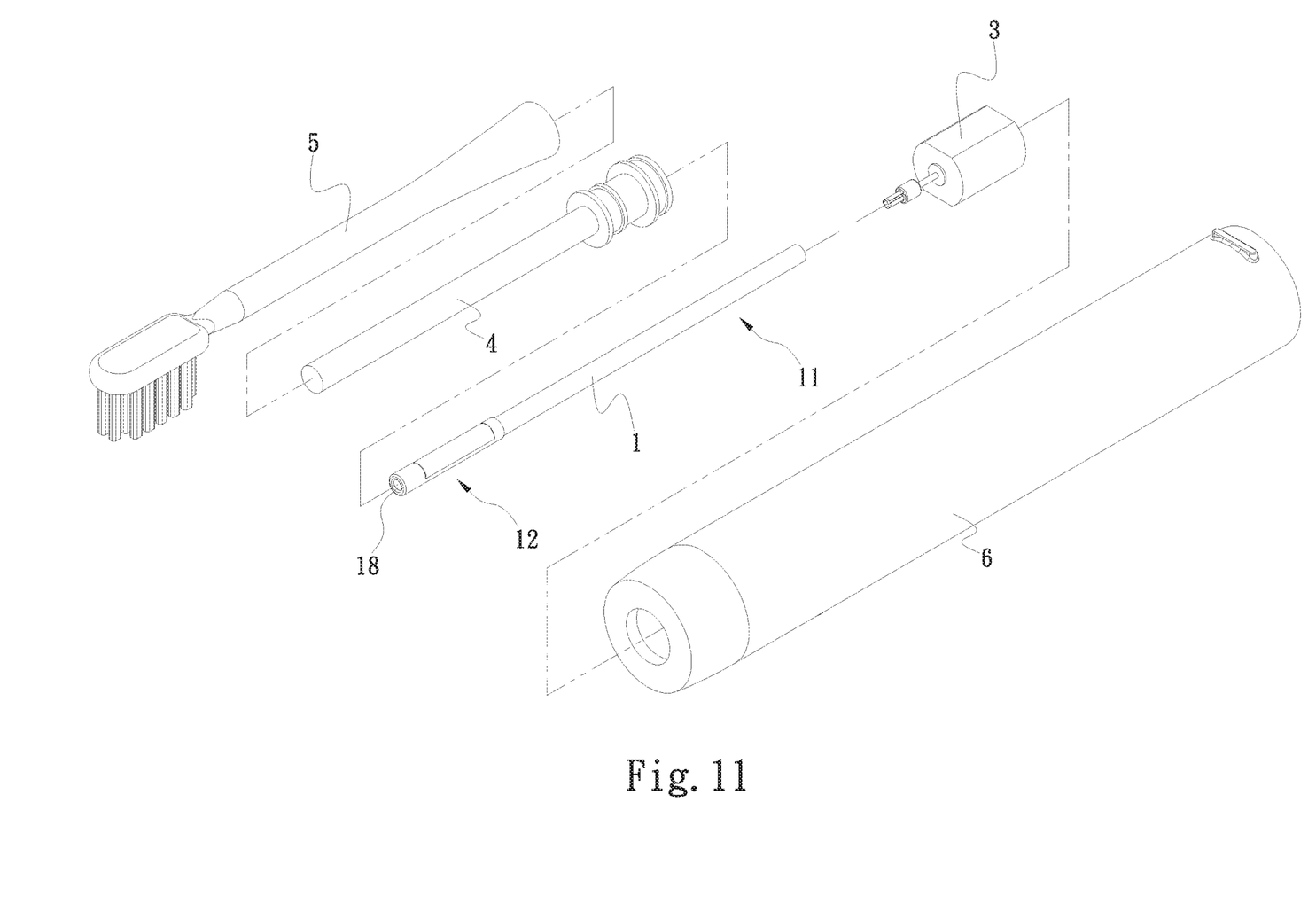
FIG. 11 is a perspective exploded view of a third embodiment of the vibration structure of electrical toothbrush of the present invention.
Figure 12:
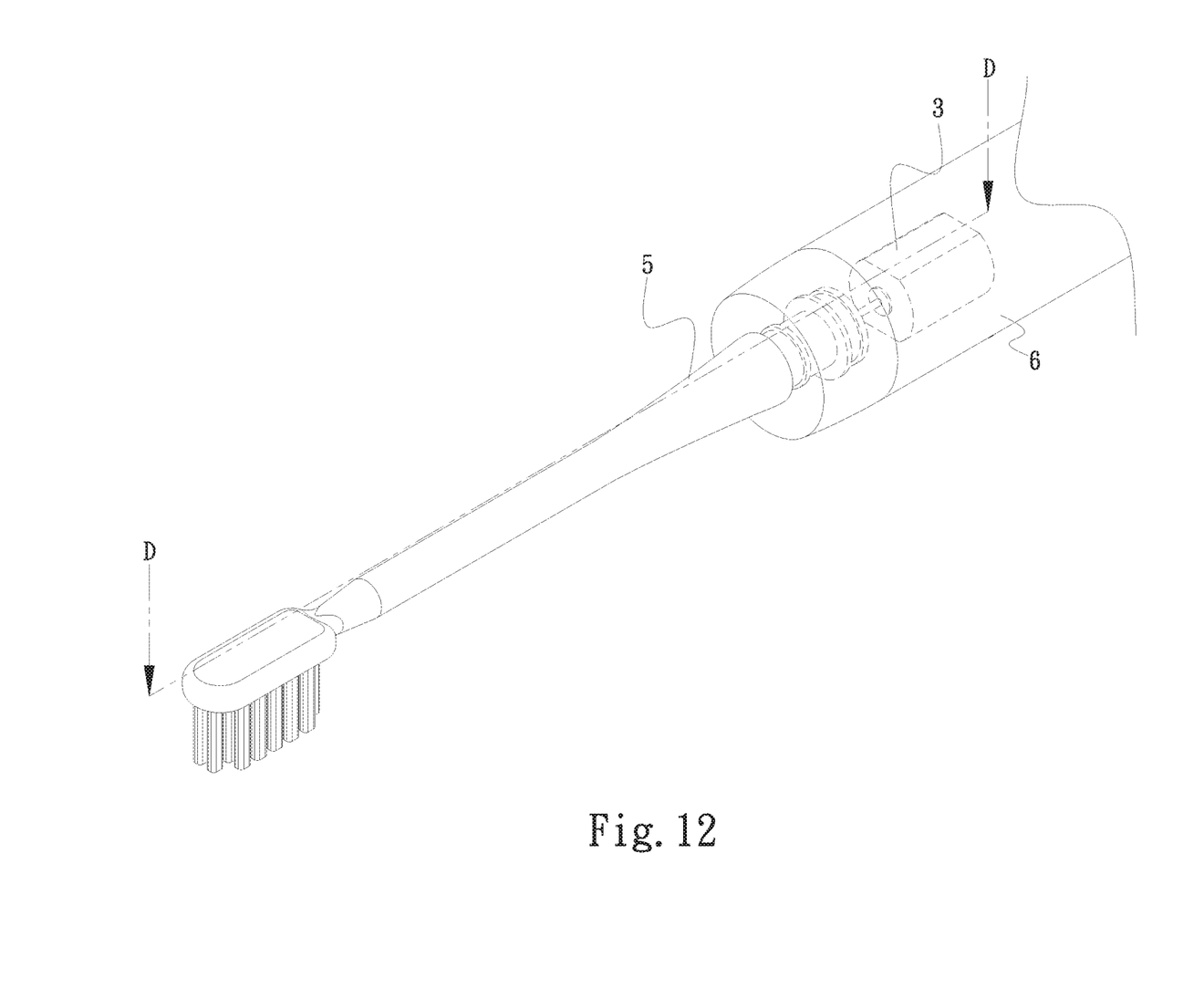
FIG. 12 is a perspective assembled view of the third embodiment of the vibration structure of electrical toothbrush of the present invention.
Figure 13:
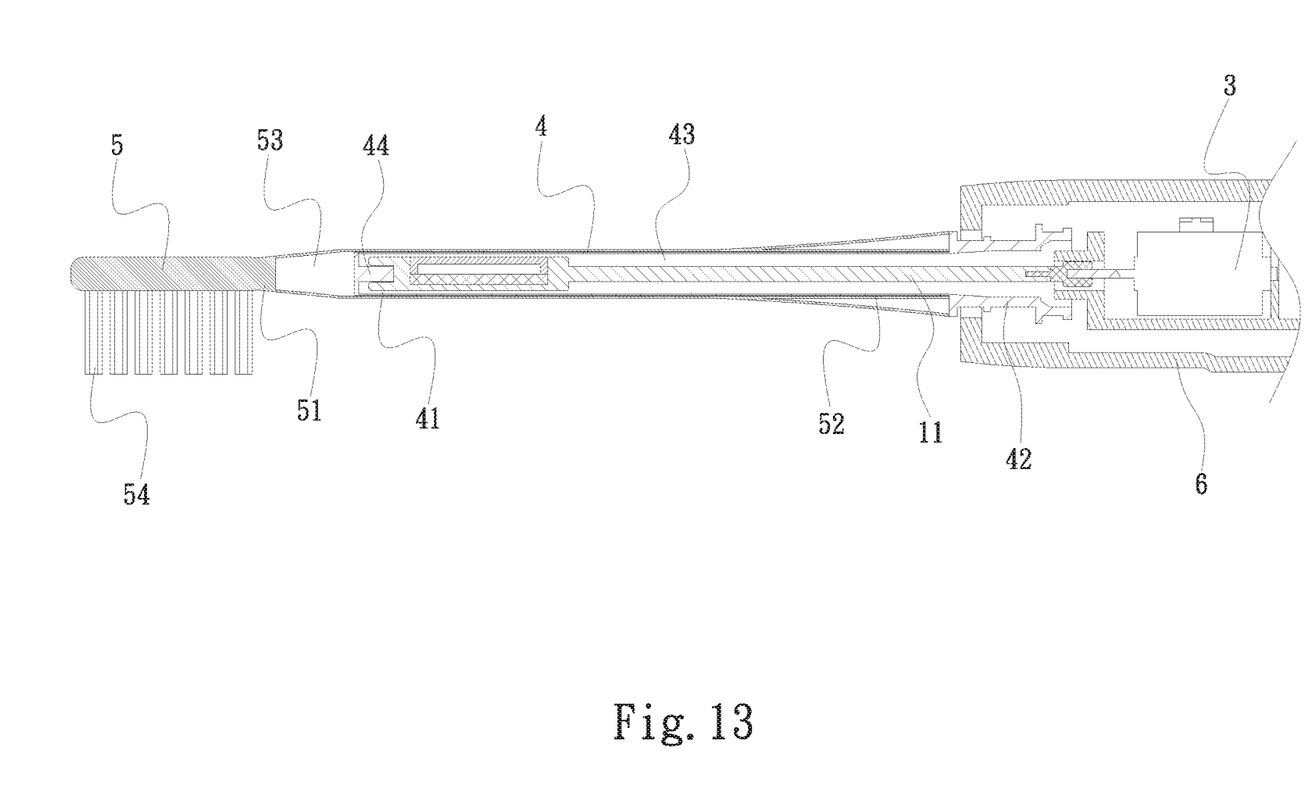
FIG. 13 is a sectional view of the vibration structure of electrical toothbrush of the present invention, taken along line D-D of FIG. 12.
Figure 14:
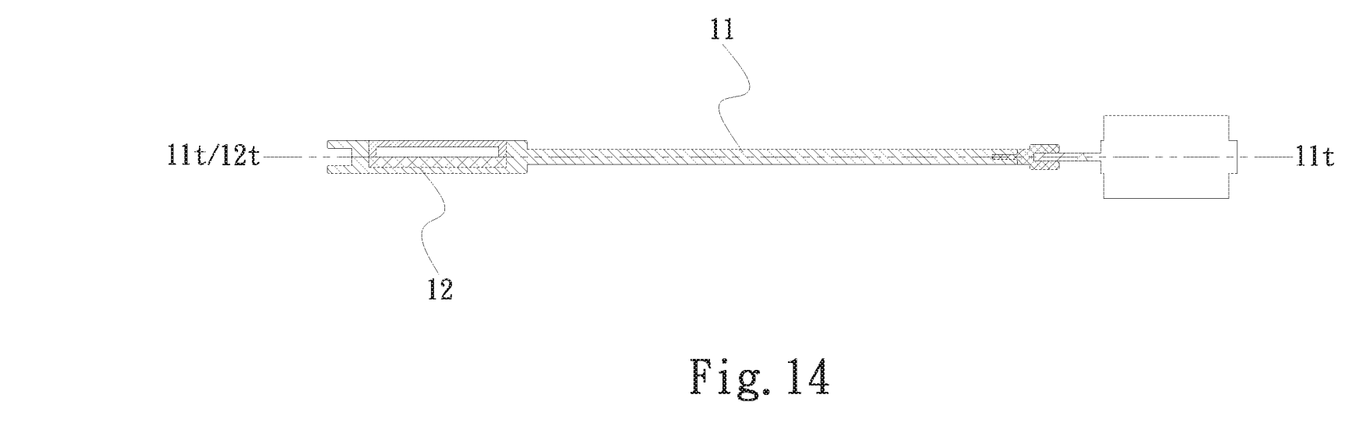
FIG. 14 is a sectional view of the vibration structure of electrical toothbrush of the present invention in a still state.
Figure 15:
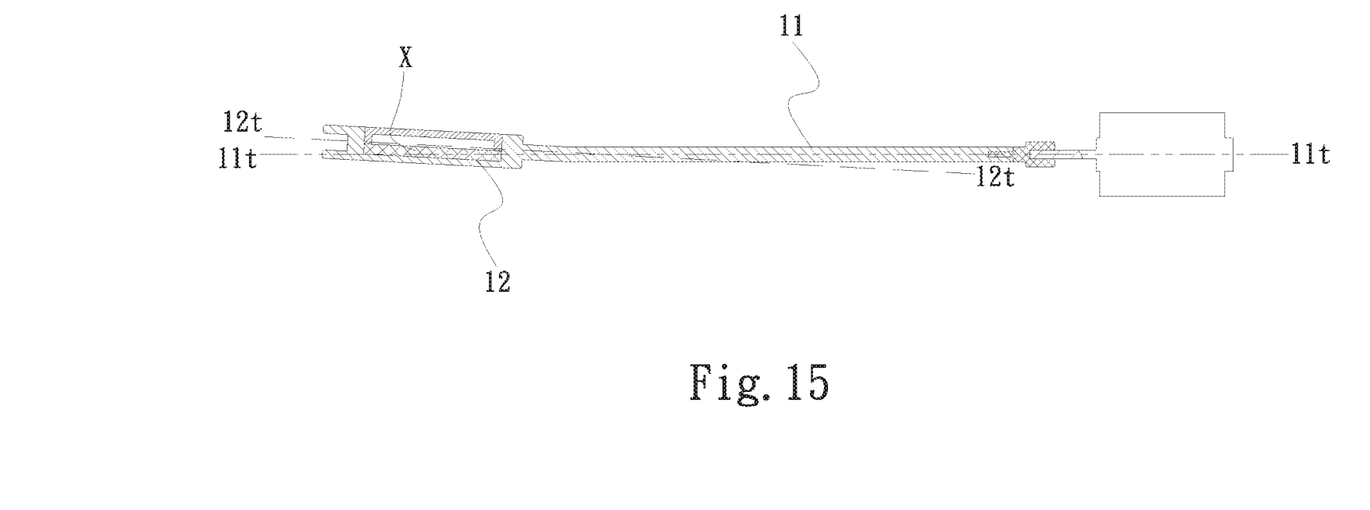
FIG. 15 is a sectional view of the vibration structure of electrical toothbrush of the present invention in a vibration state.

Please now refer to FIGS. 11 to 15. FIG. 11 is a perspective exploded view of a third embodiment of the vibration structure of electrical toothbrush of the present invention. FIG. 12 is a perspective assembled view of the third embodiment of the vibration structure of electrical toothbrush of the present invention. FIG. 13 is a sectional view of the vibration structure of electrical toothbrush of the present invention, taken along line D-D of FIG. 12. FIG. 14 is a sectional view of the vibration structure of electrical toothbrush of the present invention in a still state. FIG. 15 is a sectional view of the vibration structure of electrical toothbrush of the present invention in a vibration state. Also referring to FIGS. 1 to 10, the third embodiment is partially identical to the first and second embodiments in structure and function and thus will not be redundantly described hereinafter. The third embodiment is different from the first and second embodiments in that the vibration structure of electrical toothbrush of the present invention further includes a drive source 3, a vibration stein 4, a cleaning fitting head 5 and a main body section 6.

The drive source 3 is such as a motor for illustration purposes. The drive source 3 is correspondingly connected with one end of the transmission section 11 distal from the weight section 12 to output driving power to the eccentric rod 1.

The vibration stein 4 has a first closed end 41 and a first open end 42. The first closed end 41 and the first open end 42 together define a first space 43. A first assembling section 44 protrudes from the first closed end 41 to the first space 43.

One end section of the weight section 12 distal from the transmission section 11 has a second assembling section 18. The eccentric rod 1 is placed into the first space 43 from the first open end 42 and the first assembling section 44 is correspondingly connected with the second assembling section 18.

The cleaning fitting head 5 has a second closed end 51 and a second open end 52. The second closed end 51 and the second open end 52 together define a second space 53. A brush section 54 is disposed on outer side of the second closed end 51. The cleaning fitting head 5 is fitted around the vibration stein 4 via the second space 53.

The main body section 6 is correspondingly connected with the cleaning fitting head 5 for a user to hold. The drive source 3 is received in the main body section 6.

Accordingly, when the drive source 3 rotates to apply the driving force to the transmission section 11, the transmission section 11 is driven to make the eccentric rod 1 rotate, whereby the weight section 12 eccentrically vibrates. The vibration of the weight section 12 is transmitted from the second assembling section 18 to the first assembling section 44 of the vibration stein 4 and further transmitted to the cleaning fitting head 5. Therefore, the cleaning fitting head 5 is correspondingly vibrated.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A vibration structure of electrical toothbrush comprising:
    an eccentric rod, two ends of the eccentric rod being respectively formed with a transmission section and a weight section, the transmission section being drivable by a driving force to rotate so as to drive the weight section to eccentrically vibrate, the weight section being a hollow cylindrical body having an opening formed at a periphery of the hollow cylindrical body, the opening partially extending along a transversal length of the weight section and a receiving space inward recessed from the opening, a weight block being disposed in the receiving space and having a semicircular cross-section, a polygonal cross-section, or any geometric cross-section to partially or totally increase the weight of the weight section, whereby the weight section is unbalanced in weight to deflect from a central axis of the eccentric rod; and
    a cover member correspondingly mated with the opening to cover the same.

2. The vibration structure of electrical toothbrush as claimed in claim 1, wherein the cover member is correspondingly mated with weight section to close an outer surface of the weight section.

3. The vibration structure of electrical toothbrush as claimed in claim 1, wherein the receiving space has a circular cross section, a polygonal cross section or any geometrical cross section corresponding to the cover member.

4. The vibration structure of electrical toothbrush as claimed in claim 1, wherein the weight block is made of metal or nonmetal material.

5. The vibration structure of electrical toothbrush as claimed in claim 1, wherein the weight block and the receiving space are integrally formed or are securely connected with each other by means of insert injection molding, adhesion, engagement, press fit, welding or screwing.

6. The vibration structure of electrical toothbrush as claimed in claim 1, wherein the weight section is formed with two perforations corresponding to the opening, the two perforations radially passing through the outer surface of the weight section, the outer surface of the weight section being recessed to form two hooked holes corresponding to the perforations, the cover member being formed with two hook legs corresponding to the opening, a free end of each hook leg having a hooking section, the hook legs being respectively passed through the perforations and the hooking sections being respectively hooked in the hooked holes.

7. The vibration structure of electrical toothbrush as claimed in claim 1, further comprising a drive source, a vibration stem and a cleaning fitting head, the drive source serving to output the driving power, the drive source being correspondingly connected with one end of the transmission section distal from the weight section to output the driving power to the eccentric rod, the vibration stem having a first closed end and a first open end, the first closed end and the first open end together defining a first space, a first assembling section protruding from the first closed end to the first space, one end section of the weight section distal from the transmission section having a second assembling section, the eccentric rod being placed into the first space from the first open end, the first assembling section being correspondingly connected with the second assembling section, the cleaning fitting head having a second closed end and a second open end, the second closed end and the second open end together defining a second space, a brush section being disposed on outer side of the second closed end, the cleaning fitting head being fitted around the vibration stem via the second space.

8. The vibration structure of electrical toothbrush as claimed in claim 1, wherein the eccentric rod and the cover member are made of thermoplastic material.

* * * * *